US006201638B1

(12) United States Patent
Hall et al.

(10) Patent No.: US 6,201,638 B1
(45) Date of Patent: Mar. 13, 2001

(54) COMB GENERATING OPTICAL CAVITY THAT INCLUDES AN OPTICAL AMPLIFIER AND AN OPTICAL MODULATOR

(75) Inventors: John Lewis Hall; Scott Alan Diddams; Long-Sheng Ma, all of Boulder, CO (US); Jun Ye, Pasadena, CA (US)

(73) Assignees: University Technology Corporation, Boulder, CO (US); NIST, Washington, DC (US)

( * ) Notice: Subject to any disclaimer, the term of this patent is extended or adjusted under 35 U.S.C. 154(b) by 0 days.

(21) Appl. No.: 09/229,436

(22) Filed: Jan. 13, 1999

Related U.S. Application Data

(60) Provisional application No. 60/072,243, filed on Jan. 23, 1998.

(51) Int. Cl.$^7$ ................. H01S 3/00; H01S 3/10
(52) U.S. Cl. ............................. 359/346; 372/22
(58) Field of Search ................ 359/346; 372/22

(56) References Cited

U.S. PATENT DOCUMENTS

| | | |
|---|---|---|
| 4,590,597 | 5/1986 | Long-sheng et al. . |
| 5,184,241 | 2/1993 | Schwemmer . |
| 5,251,229 | 10/1993 | Bennett, Jr. et al. . |
| 5,387,992 | 2/1995 | Miyazaki et al. . |
| 5,684,623 * | 11/1997 | King et al. ............... 359/346 |
| 5,787,102 * | 7/1998 | Alexander et al. ............ 372/22 |
| 5,963,567 * | 10/1999 | Veselka et al. ............ 372/21 |

FOREIGN PATENT DOCUMENTS

| | | |
|---|---|---|
| 408101066A * | 4/1996 | (JP) . |
| WO 96/22623 * | 7/1996 | (WO) . |

OTHER PUBLICATIONS

Sterr et al, "A Novel Stabilization Method for an Optical Frequency Comb Generator," IEEE, pp. 574–576, 1999.*
Wong, "Proposal for a 10–THz Precision Optical Frequency Comb Generator", IEEE, pp. 1167–1168, 1992.*
Koorogi et al, "A Coupled–Cavity Monolithic Optical Frequency Comb Generator", IEEE, pp. 1698–1700, 1996.*

(List continued on next page.)

*Primary Examiner*—Mark Hellner
(74) *Attorney, Agent, or Firm*—E. C. Hancock; F. A. Sirr; Holland & Hart LLP

(57) ABSTRACT

A low-loss comb-generating optical cavity including an optical amplifier and a microwave-driven electro-optic modulator crystal, produces a comb of optical frequency sidebands having spectral lines equally spaced around the frequency of an input laser beam incident on the comb-generating cavity. The comb-generating cavity includes an input mirror movable along the beam propagation direction, and a fixed position output mirror located at time synchronous distances of both the input laser wavelength and modulation wavelength. The comb-generating cavity and its microwave driven modulator are in resonance with the input laser beam, and provide iterative or recirculating beam action that transfers the input optical frequency of the laser, sideband by sideband, to remote and precisely known comb frequencies offset from, and centered on, the input laser frequency. Optical parametric amplification within the comb-generating cavity extends the sideband or comb spectrum and sharpens the time domain impulse represented by the cavity circulating fields. A relatively short bandpass filter optical cavity receives the comb output of the comb-generating cavity and is made up of the fixed-position mirror and a third mirror movable along the beam propagation direction. Fine movement of the third mirror tunes the bandpass filter cavity, and preferentially couples out the power of one or more comb frequencies. An optional input optical cavity at the input side may increase efficiency. A self-oscillating configuration provides optical parametric oscillation.

55 Claims, 6 Drawing Sheets

OTHER PUBLICATIONS

Article entitled "A Highly Accurate Frequency Counting System for 1.5 um Wavelength Semiconductor Lasers" by M. Kourogi et al., , Proceedings from the SPIE–Nov. 16–18, 1992, conference on Frequency–Stabilized Lasers and Their Applications.

Article entitled "Frequency–Stabilized Lasers—A Parochial Review" by John L. Hall, from the Nov. 16–18, 1992 SPIE Conference Proceedings, vol. 1837 by John L. Hall.

Article "Wide Span Optical Frequency Comb Generator for Accurate Optical Frequency Difference Measurement" by M. Kourogi et al. IEEE Journal of Quantum Electronics, vol. 29, No. 10, Oct. 1993, pp. 2693–2701.

Article entitled "Efficient Optical Frequency–Comb Generator" by A.S. Bell et al., Optics Letters, Jun. 15, 1995, vol. 20, No. 12, pp. 1435–1437.

Article entitled "A Coupled–Cavity Monolithic Optical Frequency Comb Generator" by M. Kourogi et al., IEEE Photonics Technology Letters, vol. 8, No. 132, Dec. 1996.

Article "Sub–Doppler Optical Frequency Reference at 1.064 um by Means of Ultrasensitive Cavity Enhanced Frequency Modulation Spectroscopy of a C2HD Overtone Transition" by J. Long Sheng Ma et al., Optics Letters, vol. 2, No. 13, Jul. 1, 1996.

Article "Highly Selective Terahertz Optical Frequency Comb Generator" by J. Long–Sheng Ma et al., Optics Letters, Mar. 1, 1997 vol. 22, No. 6, pp. 301–303.

* cited by examiner

കോMB GENERATING OPTICAL CAVITY THAT INCLUDES AN OPTICAL AMPLIFIER AND AN OPTICAL MODULATOR

CROSS REFERENCE TO RELATED APPLICATION

Provisional patent application Ser. No. 60/072,243, filed Jan. 23, 1998, entitled OPTICAL FREQUENCY SHIFTER WITH OPTICAL GAIN by John. L. Hall, Jun Ye, and Long-Sheng Ma.

The United States of America as represented by the Secretary of Commerce, National Institute of Standards and Technology, may have rights under this invention.

BACKGROUND OF THE INVENTION

1. Field of the Invention

This invention relates to the field of optical frequency generators, and more specifically, to the generation of optical frequency combs.

2. Description of the Related Art

An Electro-Optic Modulator (EOM), when driven by an appropriate single Radio Frequency (RF) electromagnetic field, produces optical frequency light sidebands on an original single frequency light beam that traverses the EOM. The sidebands are equally spaced about the input beam. The spectral extent of the sidebands can be increased by recirculating the modulated light beam through the EOM, to thereby iteratively produce additional light sidebands on each daughter light beam that was generated by a previous interaction. In this way, an optical comb is built up, the spectral extension of which is limited by optical transmission losses, phase mismatching error associated with synchronization or length errors, and wavelength "breadth" induced phase dispersion of the EOM and its mirrors. (See, for example, "A Highly Accurate Frequency Counting System for 1.5 Micro Meter Wavelength Semiconductor Lasers', PROCEEDINGS OF THE SPIE, Vol. 1837, 16–18 Nov. 1992, pp. 205–215, by M. Kurogi, K. Nakagawa, and M. Ohtsu, and "Optical Frequency Comb Generator", *IEEE J. Quant. Electr.*, Vol. 29, Oct. 1993 pp. 2693–2701 (1993), by M. Kurogi, K. Nakagawa, and M. Ohtsu.

FIG. 1 shows the output of such a prior comb generating cavity 60 that operates to generate an optical frequency comb 61 having sideband portions 62 and 63 that are centered upon the frequency 64 of an input laser 65. Increasing frequencies within OFC 61 are shown by increasing values along the X axis, and the relative power in each comb frequency is shown on the logarithmic Y axis, the power of frequency 64 being the largest amplitude In accordance with an aspect of the present invention, comb-generating cavity 60 includes an optical amplifier or optical parametric amplifier, and the utility of optical comb 61 is enhanced by the use of a resonant and tunable bandpass filter optical cavity that operates as a direct output coupler for comb-generating cavity 60. This output coupler operates to increase the strength of a selected comb frequency component by several orders of magnitude.

A publication by John. L. Hall ("Frequency stabilized lasers—a parochial review", *Proceedings Reprint, SPIE*, Vol. 1837, 16–18 November 1992, pgs. 2–15, at section 5.4.2 on page 12) recognizes Kurogi, Nakagawa and Ohtsu as providing a microwave modulator that is enclosed in a low-loss cavity, wherein a sideband that is produced on the first transit is used as the source for a second sideband, and the second for a third, etc., whereby a spectral width of about + and −4 THz is provided, made up of individual lines spaced by the 5.6 GHz frequency. Hall then suggests "recycling" the light reflected back toward the source from the entrance mirror. It is also suggested that if this recycling cavity is short enough, the recycling cavity could be resonance free until one reaches the desired high order sideband, perhaps some THz away. The modulation power in this line would be coupled back toward the source, and could be separated with a Faraday isolator system. It is suggested that such schemes may make it feasible to transfer the stability of one optical source in a phase coherent manner to another source located an appreciable frequency interval away.

An article entitled "A Coupled Cavity Monolithic Optical Frequency Comb Generator" by M. Kourogi, T. Enaeni and M . Ohtsu in IEEE PHOTONICS TECHNOLOGY LETTERS, Vol. 8, No. 12, December 1996, describes an optical frequency comb generator (or a Fabry Perot electro-optic modulator) that generates ultra short optical pulses, and high order sidebands from a single mode laser input. A high efficiency electro-optic phase modulator is installed in a high finesse optical cavity, and driven with an integer multiple of the cavity free spectral range.

Two types of optical frequency comb generators are discussed, each having an external coupled cavity, one to achieve efficient comb generation, and the other to provide a frequency shifter.

In the FIG. 1a embodiment of this publication, a mirror M3 was mounted on a PZT transducer, and placed in front of a mirror M1 to form a coupled cavity, and the coupled cavity was adjusted to the laser frequency. As a result, the incident light is transmitted by the coupled cavity, while the coupled cavity becomes highly reflective for the sidebands generated by the comb generator.

To allow the selection of extracted sidebands, the above-described coupled cavity of FIG. 1a was removed from the input port of the comb generator, and as shown in FIG. 1b of this publication, and PZT mounted mirror M3 was installed at the output port. By adjusting the bias voltage at the PZT on which mirror M3 was mounted, an appropriate set of sidebands may be selected.

This publication also suggests that if two stable coupled cavities are installed at the input and the output port of the comb generator, the power of the selected sideband may be increased, in which case, the comb generator will become a highly efficiency frequency shifter for a wide frequency range.

An article entitled "Efficient optical frequency comb generator" by A. S. Bell, G. M. McFarlane, E. Riis and A. I. Ferguson, OPTICS LETTERS, Vol. 20. No. 12, Jun. 15, 1995, also describes an arrangement having two cavities that are locked to a laser carrier frequency. This publication describes how an unknown laser frequency can be measured with respect to a well-known standard frequency. This publication also describes how large frequency differences can be determined, based on a few rf measurements. A comb of equally-spaced modes is produced from a single laser carrier frequency. An electro-optic modulator superimposes a microwave frequency onto the carrier frequency, thus producing a comb of nodes with spacing of exactly the microwave frequency. The electro-optic modulator is placed into a three mirror dogleg cavity that is resonant to both the carrier frequency and the sidebands. A second cavity is used to ensure that most of the incident laser power is coupled into the optical cavity. To increase the coupling of the laser into the optical cavity, and hence increase the throughput of the comb generator, a PZT-mounted mirror M1 is placed before the mirror M2 of the optical cavity that contains the electro-optic modulator to thus form a coupling cavity. The coupling cavity was then frequency locked to the input light.

SUMMARY OF THE INVENTION

In an implementation of the present invention, an Electro-Optic Modulator (EOM) crystal is placed inside of a low loss, two mirror, comb-generating optical cavity that is in resonance with an input laser carrier frequency, and with all carrier sidebands frequencies. That is, the laser carrier frequency equals an integral multiple of the comb-generating optical cavity's Free Spectral Range (FSR). Equally important, the radio frequency that is applied to the modulator also is a multiple of the cavity's FSR.

More specifically, an Optical Frequency Comb (OFC) with a span that is wider than 3 THz is provided by a 10.5 GHz resonant EOM modulator that is placed inside of a resonant comb-generating optical cavity that includes two physically spaced mirrors, and whose cavity input is a reference beam produced by a He—Ne laser that operates at about 633 nanometers (i.e., red). A low noise RF microwave oscillator drives the EOM at 10.5-GHz, so that high order sidebands do not quickly collapse due to multiplied phase noise amplitude.

A two mirror, thin, bandpass filter optical cavity, having a free spectral range of 2-THz and a finesse of 400, functions as a direct output coupler for the comb-generating cavity. The bandpass filter cavity and the comb-generating cavity share a common fixed position mirror. This bandpass filter cavity is tuned into resonance with the selected sideband of the 633-nanometer laser, thus providing efficient output coupling of a selected sideband power from the comb-generating cavity. At the same time, all other sidebands are kept inside of the resonant comb-generating cavity for continued comb generation. As a result, the bandpass filter optical cavity extracts the full power of a chosen sideband from the OFC, all other sidebands are trapped inside the comb-generating cavity, and the single frequency output ensures a high Signal to Noise Ratio (SNR) in a heterodyne experiment.

This invention provides a highly selective Optical Frequency Comb (OFC) generator which can phase coherently bridge a wide frequency interval of more than a few terahertz (THz); for example, 4 THz. The OFC comprises a plurality of equally-spaced spectral lines that are grouped around the reference spectral line established by the carrier frequency laser. The novel features include the provision of an intercavity optical amplifier, such as an optical parametric amplifier, within the comb-generating cavity.

It is an object of this invention to provide a comb-generating optical cavity having a first mirror that is physically movable along the cavity's propagation axis, having a second mirror that is mounted at a fixed position on the propagation axis, and having an optical amplifier and a microwave modulated EOM crystal (for example, Mg:LiNbO₃) located on the propagating axis between the first and second mirrors. A reference laser beam (for example, from a He—Ne laser or a Nd:YAG laser) is directed onto the first mirror, and thus into the comb-generating cavity, along the comb-generating cavity's propagation axis. A direct reflection beam from the first mirror and a leakage beam from the comb-generating cavity are compared to control the position of the first mirror, and to thus control the physical length of the comb-generating cavity. A tunable bandpass filter optical cavity is located on the propagation axis, directly downstream of the comb-generating optical cavity, in a manner to receive the comb output of the comb-generating optical cavity. The bandpass filter optical cavity comprises the second (fixed position) mirror that is within the comb-generating cavity, and a third mirror that is movable along the propagating axis. Selective tuning of the bandpass filter optical cavity is achieved by positioning of this third mirror. In this manner, a selected bandpass characteristic of the bandpass filter optical cavity operates to pass a portion of the comb output.

Another object of the invention is to provide apparatus having a comb-generating optical cavity that includes both an optical modulator, for example an electro-optic modulator, and an optical amplifier, for example an optical parametric amplifier.

Another object of the invention is to provide apparatus having a comb-generating optical cavity that includes both an optical modulator or electrooptic modulator and an optical amplifier or optical parametric amplifier, and a common mirror bandpass filter optical cavity that directly receives the output of the comb-generating cavity.

Another object of the invention is to provide apparatus having a comb-generating optical cavity that includes both an optical modulator or electro-optical modulator and an optical amplifier or optical parametric amplifier, a common mirror output bandpass filter optical cavity, and an input bandpass filter optical cavity that is tuned to the frequency of the input or reference laser.

In the various figures discussed below, an optical amplifier or optical parametric amplifier, and an optical modulator or elector-optic modulator are shown as two individual structural elements. As a feature of this invention, these two optical elements may be provided as a single unitary structural assembly rather than two individual assemblies a shown in the various figures.

These and other features, advantages and objects of the invention will be apparent from the following detailed description, which description makes reference to the following drawings.

The foregoing and other features, utilities and advantages of the invention will be apparent from the following more particular description of a preferred embodiment of the invention as illustrated in the accompanying drawings.

DESCRIPTION OF THE PREFERRED EMBODIMENTS

Figure 1:
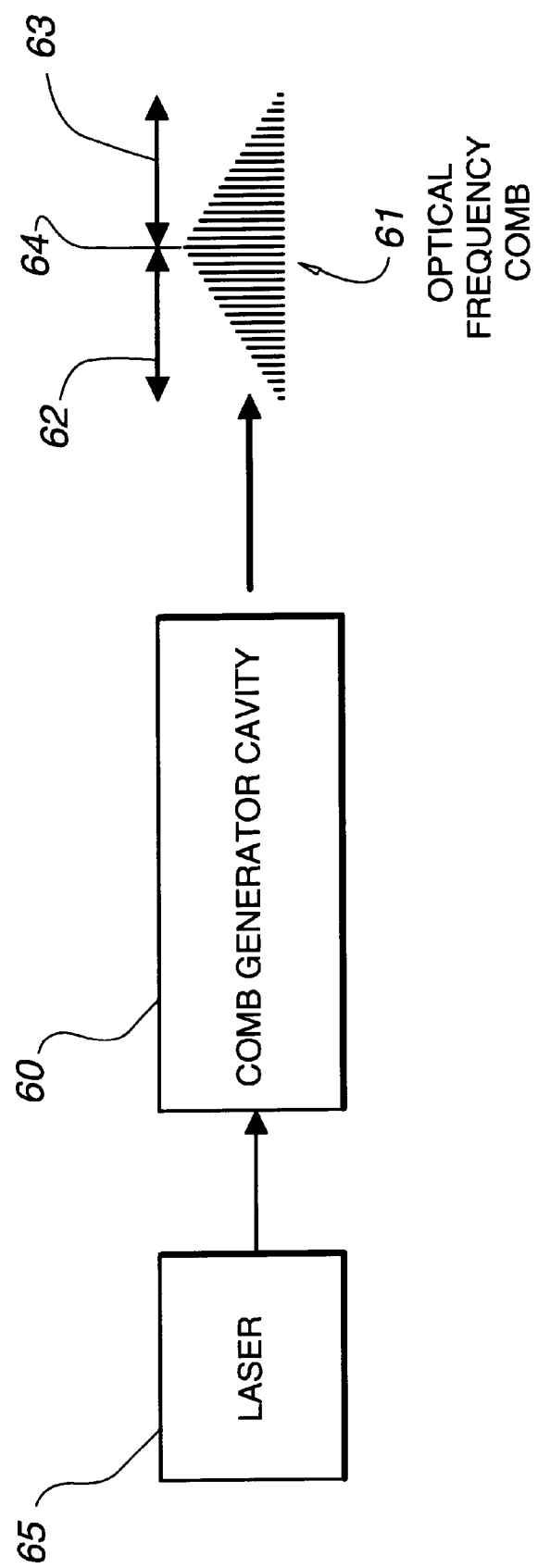
FIG. 1 is useful in understanding the operation of a prior art comb-generating optical cavity.
Figure 2:
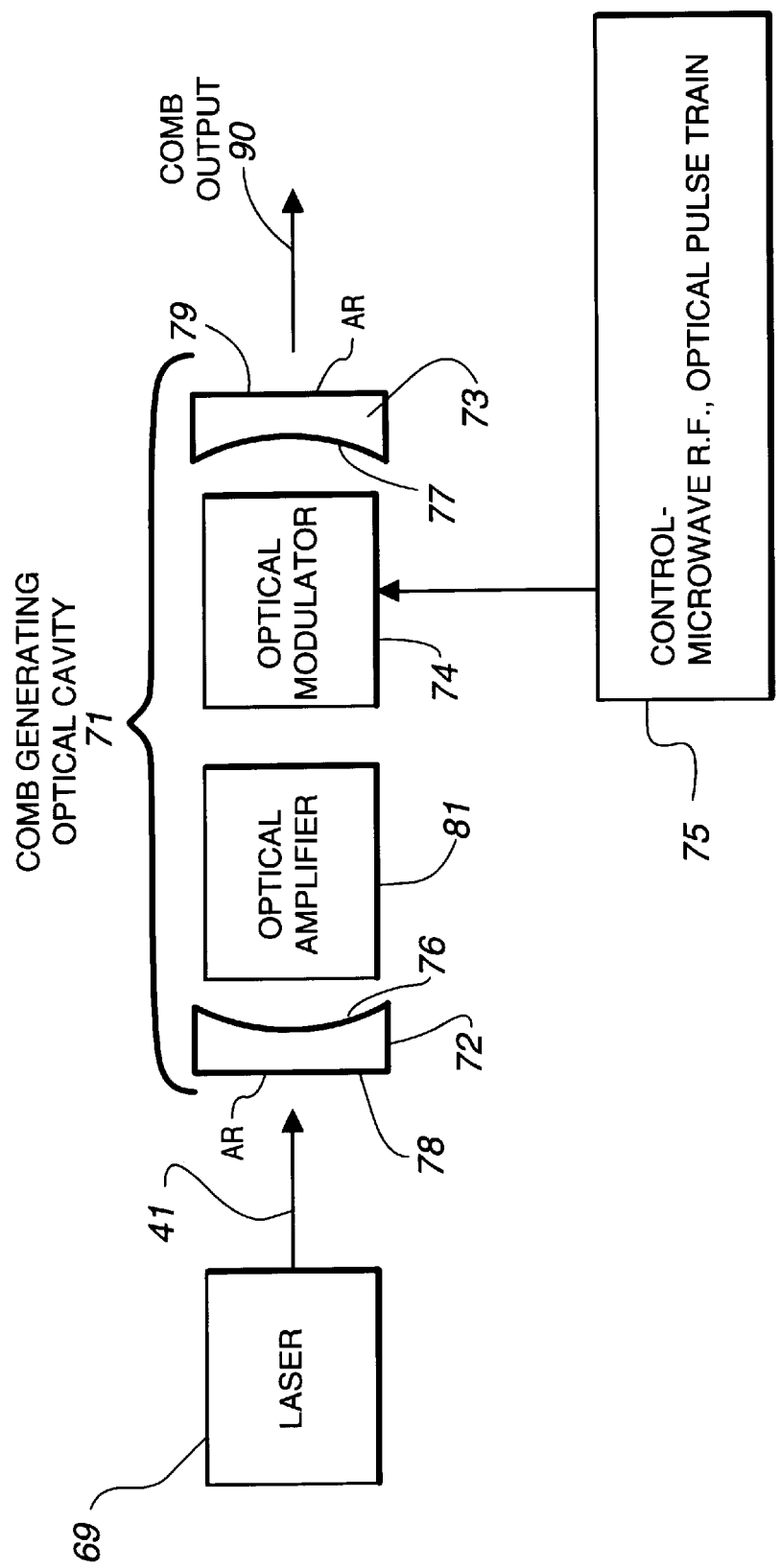
FIG. 2 shows the principle of the present invention in an embodiment wherein a comb-generating optical cavity includes both an optical modulator or an electro-optic modulator, and an optical amplifier or an optical parametric amplifier.

The principle of the present invention can be understood by reference to FIG. 2 which shows an optical comb-generating cavity 71 that includes both an optical amplifier 81 (or an optical parametric amplifier 81), and an optical modulator 74 (or an electro-optic modulator 74). The order of the two elements 81, 17 within cavity 71 is not significant. That is, while optical amplifier 81 is shown positioned upstream of optical modulator 74 (i.e., optical amplifier 81 is closer to laser 69 than is optical modulator 74), this relative positioning of optical amplifier 81 and optical modulator 74 is not critical to the invention.

In FIG. 2, a comb-generating cavity input mirror 72 and a comb-generating cavity output-mirror 73 are shown as having inward-facing concave surfaces 76 and 77, and outward-facing flat surfaces 78 and 79. Using this type of cavity mirror, concave surfaces 76, 77 are coated to be highly reflective to the wavelength of laser 69, and flat surfaces 78, 79 contain no coating, or more preferably, are coated to be anti-reflective. Mirror 73 is mounted at a fixed position, and mirror 72 is movable, as will be explained relative to FIG. 5. That is, mirror 72 is PZT-movable in the manner of mirror 18 of FIG. 5, and mirror 73 is mounted at a fixed-position in the manner of mirror 19 of FIG. 5.

Optical modulator 74 is controlled or modulated by a control system, or network 75, that comprises RF microwave control input to modulator 74, or an optical pulse train control input to modulator 74. More generally, control system 75 operates to vary the optical transmission property of optical modulator 74, or to vary the effective optical path length of optical modulator 74. That is, the time of transmission of a beam within optical modulator 74 is controlled or modulated.

Operation of the apparatus shown in FIG. 2 provides an optical frequency comb output 90. Other useful optical configurations to achieve this stable cavity are presented below.

As a feature of this invention, optical amplifier 81 and optical modulator 74 may be provided as a single unitary assembly rather than as two individual assemblies as shown in FIG. 2, and the various figures discussed below.

An optical amplifier can be based upon any of the many known laser transitions in many laser media. While many laser transitions are known, the number of practically useful laser transitions are relatively few, and generally do not afford full spectral coverage. It is known that non-linear optical processes are a way of shifting a laser wavelength from where it is available to where it is needed. It is also known that the parametric process offers the possibility of generating a continuous range of frequencies from a single frequency source.

The term optical parametric amplifier, or more generally optical amplifier as used herein, is intended to mean a frequency difference generator. An optical parametric amplifier implements a second order non-linear optical process, and is a source of broadly tunable coherent radiation that is capable of covering the entire spectral range from the near-UV to the mid-IR with operation down to the femtosecond time domain.

The spontaneous parametric process, also known as parametric luminescence or parametric fluorescence, is a process in which an incident photon, called a pump photon, propagating in a non-linear medium, such as a crystal, breaks down spontaneously into two photons of lower frequency; one called a signal photon and the other called an idler photon.

In the parametric amplification process, and with only the pump photons present in an initial state, spontaneous emission occurs at frequencies for which the signal and idler frequencies are under phase matched conditions. With signal photons and pump photons present in the initial state, stimulated parametric emission occurs in the same way as in a laser medium, except that the pump photons are converted directly into signal photons, and corresponding idler photons through the second order non-linear optical process, and no exchange of energy with the crystal medium is involved. The parametric amplification process can also be viewed as a repeated difference-frequency process in which the signal photons and idler photons repeatedly mix with the pump photons in the crystal medium, generating more and more signal photons and idler photons under phase matched conditions.

It is known that a parametric oscillator can be constructed by adding a pair of Fabry-Perot mirrors to a parametric amplification process that includes a suitable non-linear optical crystal. It is known that optical parametric oscillators are used in wavelength shifting non-linear optical devices. Tuning of the optical parametric oscillator can be achieved by rotating the crystal relative to the direction of propagation of the pump beam or the axis of the Fabry-Perot cavity, or by changing the crystal's phase-marching conditions with temperature or electric field.

An optical modulator, or electro-optic modulator, as used herein is intended to mean a medium, usually a crystal, that, when driven by a control signal, operates to produce optical frequency information carrying sidebands upon an original single frequency beam that is incident upon the optical modulator. The modulator transition phase, or amplitude, may be controlled by a suitable RF or optical control input.

For some purposes, it is convenient to receive as an output only a single optical frequency that is within FIG. 2 comb output 90, wherein this single optical frequency is displaced from the comb-generating optical cavity optical input by a multiple of a control frequency 75.

Figure 3A:
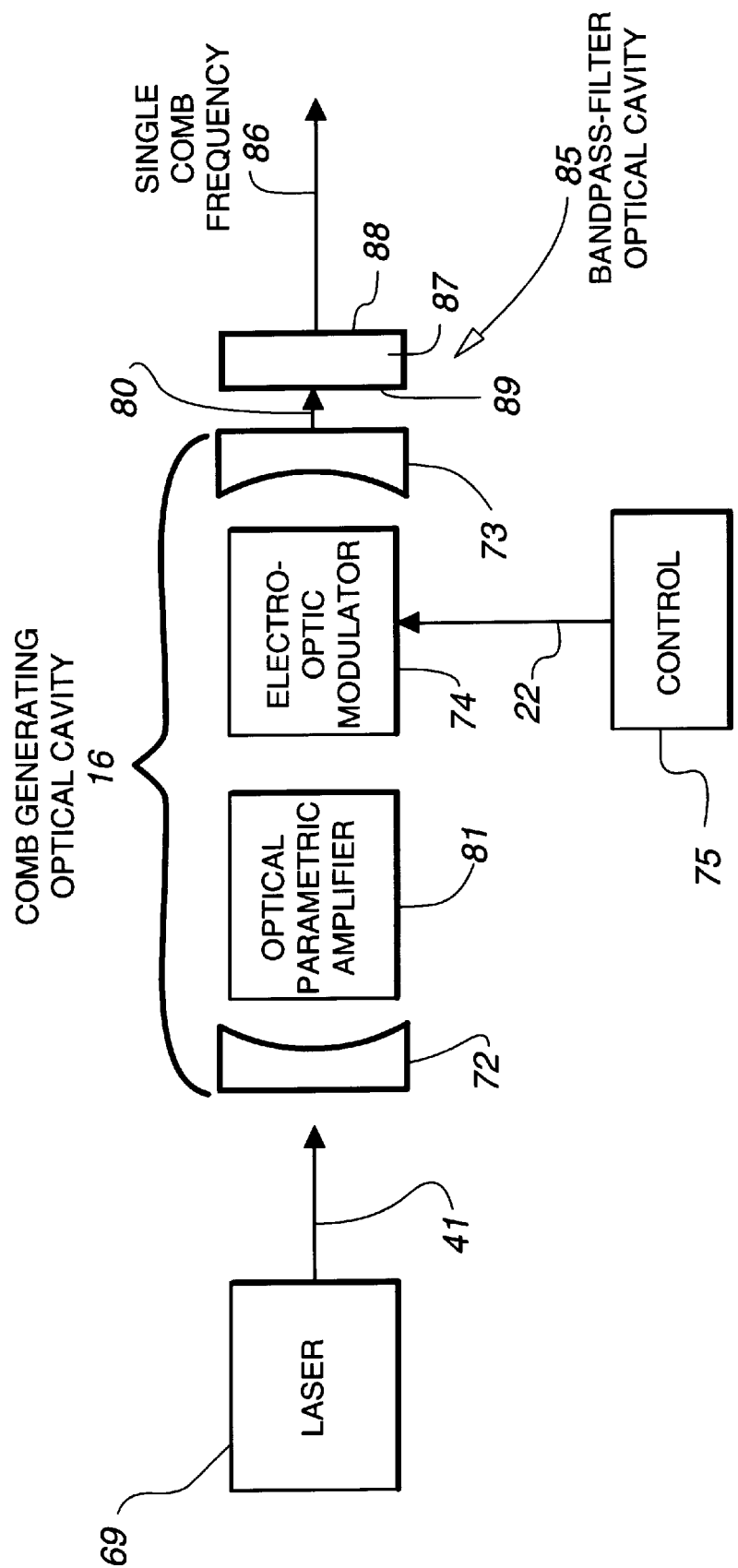
FIGS. 3A and 3B present the present invention as shown in FIG. 2, wherein an additional mirror forms an auxiliary, or output bandpass filter cavity to facilitate the efficient recovery of a single output sideband that is within the optical comb, FIG. 3B also showing the optical spectral components involved.
Figure 3B:
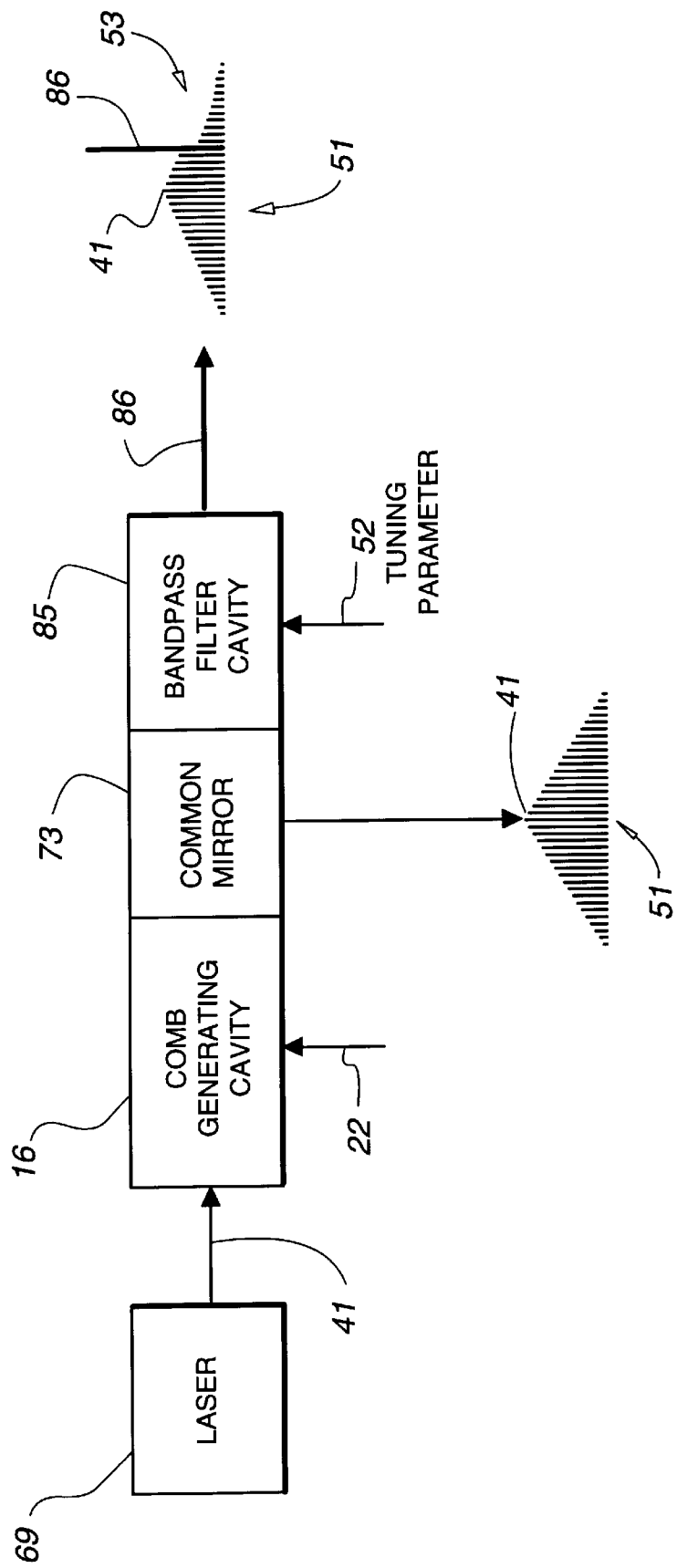

Such an important version of the present invention is shown in FIGS. 3A and 3B wherein a comb-generating optical cavity includes both an optical amplifier or optical parametric amplifier, and an optical modulator or electro-optic modulator, and wherein a tunable bandpass filter optical cavity is directly coupled to receive a comb output from the comb-generating optical cavity, and wherein the comb-generating optical cavity and bandpass filter optical cavity share a common fixed position mirror.

FIG. 3A shows the invention shown in FIG. 2 wherein an additional mirror 87 forms an auxiliary bandpass filter cavity 85 that facilitates the efficient recovery of a single output sideband 86 from comb output 90 of FIG. 2. FIG. 3B also shows this configuration of the invention, wherein an additional mirror, such as 87 of FIG. 3A, and a common mirror, such as 73 of FIG. 3A, forms an auxiliary bandpass filter cavity 85 that facilitates the efficient recovery of a single output sideband 86 from comb output 80 of comb-generating cavity 16.

More specifically, FIG. 3A shows an embodiment of the invention wherein an output optical bandpass filter cavity 85 (as will be described with reference to FIG. 5 cavity 33) is added to the above-described FIG. 2 embodiment. In FIG. 3A, optical bandpass filter cavity 85 is made up of fixed position common mirror 73, and a third movable mirror 87 that is PZT-movable in the manner of mirror 34 of FIG. 5, as will be described.

In this embodiment of the invention, third mirror 87 is shown as having two flat faces 88 and 89, in which case both faces 88 and 89 contain no coating, or more preferably, flat surfaces 88 and 89 are provided with an anti-reflective coating. The objective of providing focusing action of mirror 73 can be realized with advantage by a convex piano lens, as will be shown below.

Optical bandpass filter cavity 85 operates upon the broad frequency comb output 80 of the comb-generating cavity 72, 81, 74, 73 to provide a single comb frequency output 86.

With reference to FIGS. 3A and 3B, reference laser beam 41 is presented to the input mirror 72 of comb-generating cavity 16 and the EOM 74 within comb-generating cavity 16 receives a modulation control signal 22 by way of control network 75.

Mirror 73 that is shared between comb-generating cavity 16 and bandpass filter cavity 85 affects the direct coupling of the two optical cavities 16 and 85. This common mirror 73, functioning within comb-generating cavity 16, operates to provide comb output 80 that comprises comb frequency spectrum 51, i.e., a large number of sidebands that are centered on the reference frequency 41 of reference laser beam 41, which sidebands progressively decrease in magnitude away from center frequency 41.

Bandpass filter optical cavity 85, which includes common mirror 73, receives a tuning parameter input 52 (i.e., the physical position of mirror 87), and as a result of tuning input 52, optical cavity 85 bandpass operates on comb spectrum 51 to provide a single frequency beam output 86 that comprises a selected one 86 of the many frequencies that are within comb spectrum 51 (or a selected group of the comb frequencies, dependent upon the magnitude of the physical separation between mirrors 73 and 87 that is achieved by tuning parameter 52, as will be described).

The use of a common mirror 73 within both comb-generating cavity 16 and bandpass filter cavity 85 can be appreciated by considering the hypothetical use of two separate cavities, each cavity having two mirrors. In this case, multiple reflections occur between the two, two mirror cavities and must be controlled, for example by the use of an optical isolator that is physically located between the output mirror of the comb-generating cavity and the input mirror of the bandpass filter cavity. The present invention does not require such an optical isolator, and produces a larger output power since in the above four mirror hypothetical case, the desired output comb line is only available due to "leakage" through the fixed mirror of the optical frequency comb generator. Instead, the output of a single comb line 86 can approach the power level that is within the basic comb generating cavity 16.

Figure 4:
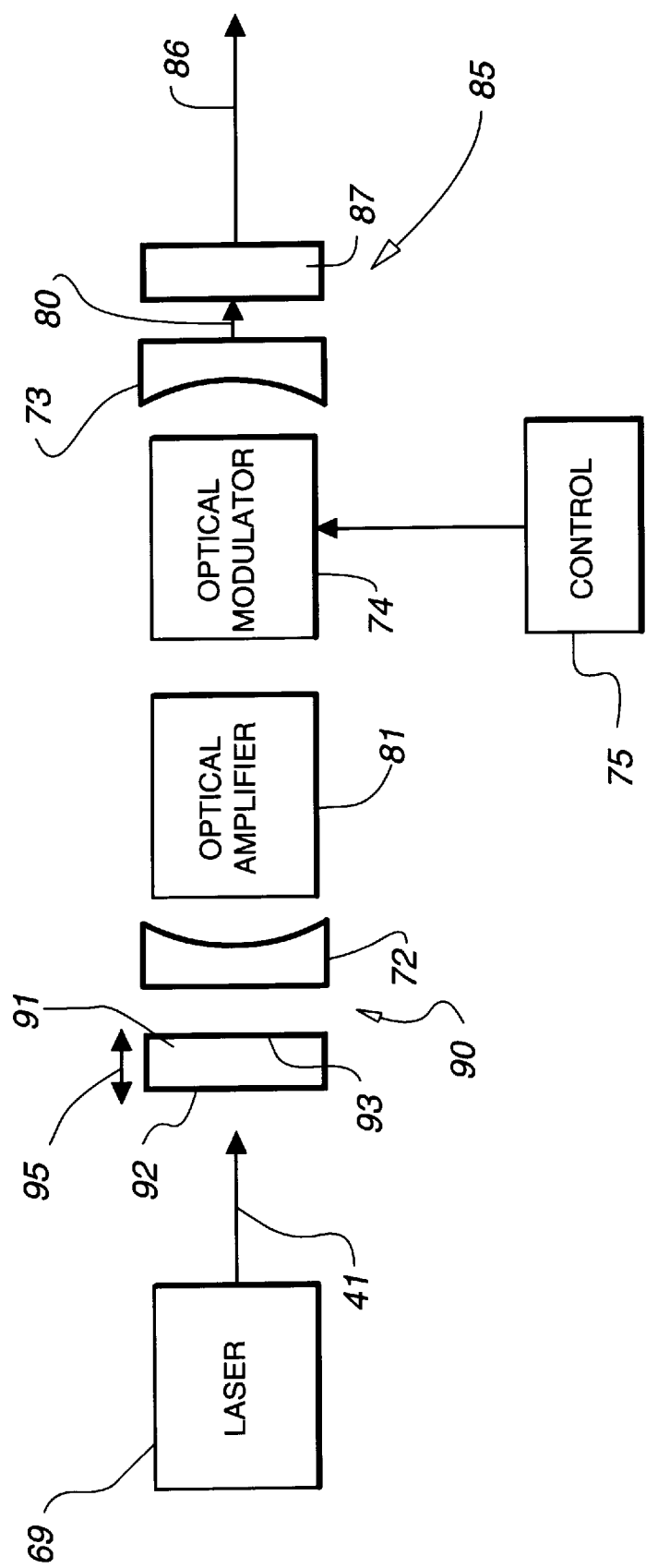
FIG. 4 shows an embodiment of the invention wherein an input bandpass filter optical cavity is added to the FIG. 3A embodiment to improve the in-coupling efficiency.

FIG. 4 shows an embodiment of the invention wherein a tunable input bandpass filter optical cavity 90 is added to the FIG. 3A embodiment to improve the in-coupling efficiency of the comb-generating optical cavity. Input bandpass filter optical cavity 90 is made up of two mirrors that comprise movable mirror 72 that functions within comb-generating optical cavity 72, 81, 74, 73, and a fourth movable mirror 91. That is, mirror 72 is common to both comb-generating cavity 72, 81, 74, 73 and tunable input bandpass filter optical cavity 90.

Mirror 91 is shown as having two flat faces 92 and 93, in which case, both faces 92 and 93 contains no coating, or more preferably, flat surface 92 is provided with an anti-reflective coating.

In operation, mirror 91 is moved along the system's propagation axis, as indicated by arrow 95, until a mirror position is found where a maximum magnitude is provided in output 86 from bandpass filter optical cavity 85. This movement of mirror 91 to maximize output 96 corresponds to a minimum reflected light condition and can take place while control source 75 is not operative, in which case, output 86 comprises only the unique frequency of reference laser beam 41.

Input optical cavity 90 operates to increase the efficiency of the system in that input optical cavity 90 provides more efficient coupling of the input beam 41 from laser 69 to comb-generating optical cavity 72, 81, 74, 73. In this manner, output 86 is generated as in the FIG. 3A, 3B embodiment, having the large magnitude characteristic that is shown at 86 of FIG. 3B. However, in the FIG. 4 embodiment, more shifted frequency power exists in output 86 due to the improved input coupling that is provided by input optical cavity 90. In order to provide a detailed implementation of the above-discussed principles of the invention, FIG. 5 and the following discussion provides a detailed teaching relative to the current best practice of the invention.

Figure 5:
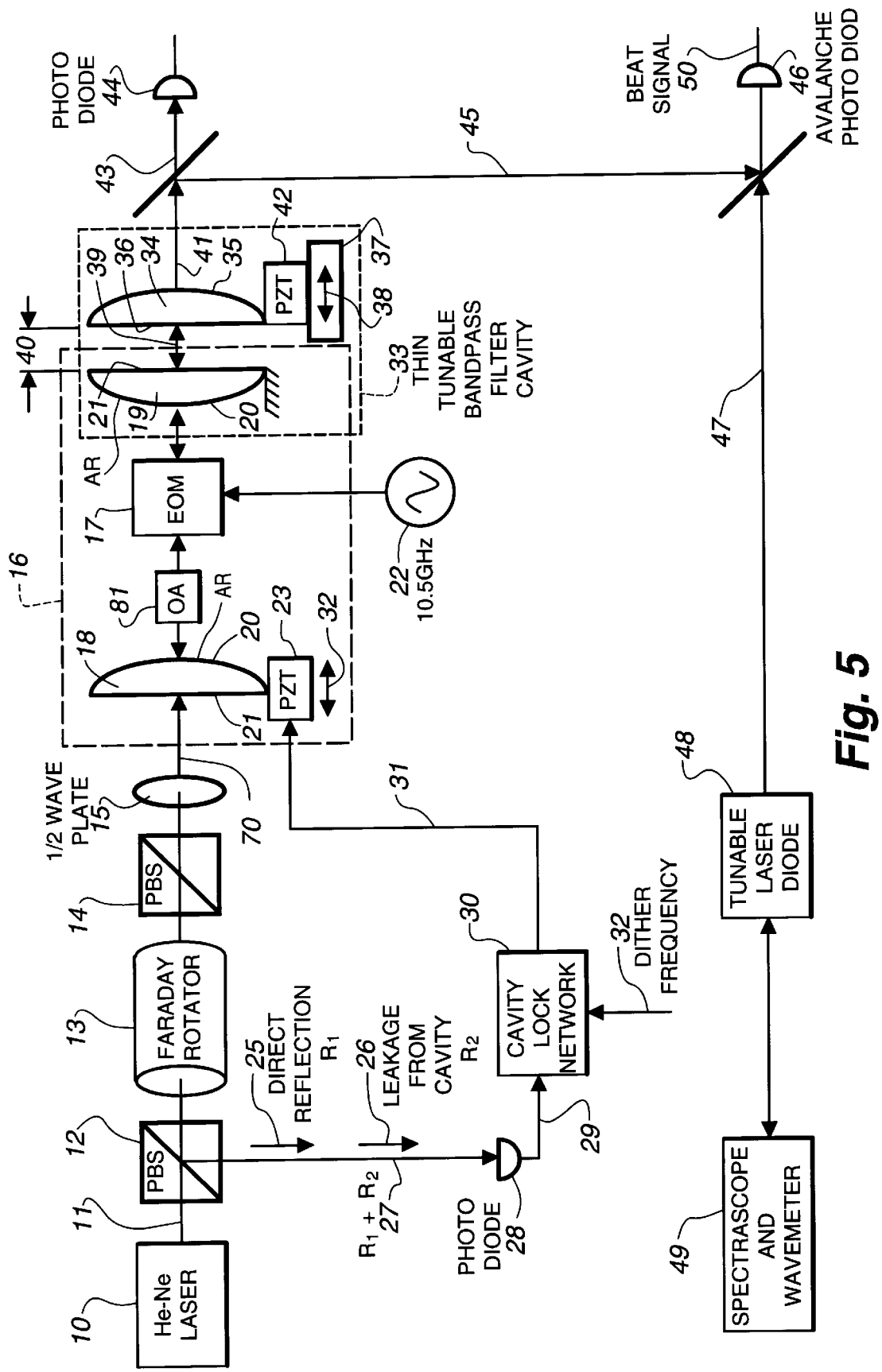
FIG. 5 shows an experimental realization of the invention.

With reference to FIG. 5 which shows an experimental realization of the invention, a laser 10 generates a reference frequency beam 11 that is directed along a propagation axis 70, laser 10 being a polarization stabilized laser that provides output beam 11. While a 150 micro watt He—Ne laser is shown in this embodiment of the invention, the spirit and scope of the invention is not to be limited thereto. In particular, successful experiments have employed a Nd:YAG laser emitting 1.06-micro meter radiation.

Beam 11 traverses in order, a first polarized beam splitter (PBS) 12, a Faraday rotator 13, a second PBS 14, and a one-half wave plate 15.

Beam 11, whose polarization has been modified by directional isolators 12–15, now enters a comb-generating optical cavity that is shown within broken line 16. Optical cavity 16 includes an optical amplifier 81 or a parametric optical amplifier 81, and a microwave-driven optical modulator 17, or a microwave-driven electro-optic modulator 17. Within the spirit and scope of this invention, EOM 17 comprises any suitable electro-optic crystal. In an embodiment of the invention, EOM 17 comprises a broadband, anti-reflection coated, Mg:LiNbO$_3$ crystal having dimensions of about 35.4 mm by 1.0 mm by 2.0 mm.

Optical amplifier (OA) 81 and electro-optic modulator (EOM) 17 are both embedded within comb-generating optical cavity 16, this cavity including an entry mirror 18, and an exit mirror 19. Mirrors 18 and 19 are identical lens substrates; for example, of a glass or a crystal optical material having an effective focal length of about 25.0 cm. In this embodiment of the invention, the convex faces 20 of mirrors 18 and 19 could be uncoated, or are preferably coated to be anti-reflective (AR) at the working wavelength, and the flat faces 21 of these two mirrors are coated to have high reflectivity, for example about 99.6%.

EOM 17 is driven by an AC microwave source 22 having a frequency of about 10.5-GHz. The design of the microwave EOM 17 uses a waveguide geometry that forces a match in OEM crystal 17 between the microwave phase velocity and the optical phase velocity of the laser beam 11 that is emitted by laser 10. The microwave resonance at 10.5-GHz has a bandwidth of about 0.3-GHz and a Q factor of about 230. A modulation index of about 0.8 is obtained with a microwave power of about 0.6 watts.

In order to lock the propagation length of comb-generating optical cavity 16 onto the wavelength of input laser 10, the position of input or entry mirror 18 is controlled by operation of a piezoelectric transducer (PZT) 23. As will be appreciated by those of skill in the art, two beam portions R1 and R2 are "reflected" by comb-generating optical cavity 16. The first of these two beam components, 25 or R1, comprises a beam that is directly reflected from the flat surface 21 of input mirror 18, whereas the second of these two beam components, 26 or R2, comprises a cavity modulated beam that leaks out from comb-generating optical cavity 16. A composite beam 27, comprising R1+R2, is detected by a photodiode 28. The electrical output 29 of photodiode 28 is provided as an input to cavity lock network 30. Cavity lock network 30 operates to provide an electrical output 31 that energizes PZT 23, to thus cause input mirror 18 to physically move as shown by arrow 32. In this way, operation of cavity lock network 30 compares the phase and magnitude of directly reflected beam 25 to the phase and magnitude of leakage beam 26, and generates an output 31 that is effective to move mirror 18 so that the quantity R1+R2 is minimized. In an embodiment of the invention, the beam minimizing physical position of mirror 18 was dithered by applying a dither frequency signal 32 to cavity lock network 30, the dither length being relatively small (about $\frac{1}{10}^{th}$ of the cavity line width). Light beam 27, or R1+R2, was then phase sensitive detected by cavity lock network 30 against dither frequency 32 to provide a cavity discriminator signal.

In FIG. 5, a physically short dimension output, and tunable bandpass filter optical cavity, identified by broken lines 33, is made up of above-mentioned fixed position mirror 19 and a third mirror 34. Mirror 34 is identical to mirrors 18 and 19 in that it preferably has an identical lens substrate with an effective focal length of about 25 cm, a convex face 35 that is coated to be anti-reflective at the working wavelength, and a flat face 36 that is coated to have high reflectivity; for example, about 99.6% reflective.

In order to selectively tune bandpass filter optical cavity 33, mirror 34 is mounted onto a slide stage 37 that is movable, for example manually, in the propagation direction as indicated by arrow 38. Movement of slide stage 37, as affected by a micrometer, operates to adjust the very short physical separation 40 that exists between the flat surface 21 of mirror 19 and the flat surface 36 of mirror 34. This bandpass tuning of filter cavity 33 operates to cause a desired one, or a group of, the large number of comb frequencies that are present at beam location 39, between mirror 19 and mirror 34, to be provided as an output beam 41 from bandpass filter optical cavity 33.

By way of example, distance 40 is adjusted to be in the micron range when a single comb frequency 41 is desired, and distance 40 is adjusted to be in the millimeter range when a group of comb frequencies are desired at bandpass filter output 41. Coarse tuning of optical cavity 33 is produced by micrometer adjustment of slide stage 37, whereas fine tuning of optical cavity 33 is produced by operation of PZT 42.

As a feature of the invention, PZT 42 is mounted on the precision mechanism or motion stage 37 to allow spacing 40 to be varied from micro meters to a few millimeters. PZT 42 is energized so as to fine tune bandpass filter optical cavity 33 to a selected comb frequency or frequencies.

In an embodiment of the invention, the comb-generating cavity 16 that is formed by mirrors 18 and 19 has a finesse of about 400, a FSR of about 2 THz, a transmission efficiency of about 30%, and increased output power of the selected sideband 41 by a factor of 150.

In FIG. 5, the portion 43 of the OFC's comb output 41 is monitored by a DC photodetector in the form of photodiode 44, and the portion 45 of the OFC output 41 is sent to an avalanche diode 46 for heterodyne mixing with the output 47 of a cavity external, and tunable laser diode 48 that is tuned by operation of spectroscope and wavemeter 49. Avalanche diode 46 operates to provide heterodyne detection of the selected OFC sideband 41.

In an embodiment of the invention, operation of the apparatus of FIG. 5 provides enough resolution to resolve individual comb sidebands that are spaced about 10.5-GHz apart, and good SNRs were observed beyond sideband number 150. For a still wider comb output, a wider FSR of the comb-generating cavity 16 or comb-line-selecting cavity 33, will be appropriate.

In FIG. 5, the efficiency of the OFC generator is improved by the use of the two mirrors 19, 34 that make up a short filter cavity filter 33 that operates to permit the efficient escape of the selected comb sideband component(s) 41. With limited power from He—Ne laser 10, a beat signal 50 with a SNR of 20 dB and a 100 kHz bandwidth was produced.

As stated above, motion stage 37 and PZT 42 are used to position mirror 34 along propagation axis 70 in order to provide a peak or power output for a desired comb frequency (s) component 41 that is within comb output 39. While a number of tuning schemes will be apparent to those of skill in the art, one scheme involves turning off microwave source 22, such that the only frequency now within output 39 is that of reference frequency of laser 10. The position of mirror 34 is then adjusted to seek a maximum signal output 41. As a result, it is known that bandpass filter optical cavity 33 is now tuned to this reference frequency, and it is also known that this reference frequency is the center frequency of any subsequently-generated comb output 39. The gap dimension 40 that now exists between mirrors 19 and 34 can be called a reference gap.

Microwave source 22 is now turned on, and a multi-frequency comb output 39 is now generated. It is known that the comb frequencies are spaced by the 10.5-GHz frequency of microwave source 22. Thus, a desired one of the frequencies within comb output 39 can now be found by moving mirror 34 and counting a precalculated number of maximum/minimum signal intensities in output 41, whereupon it is known that the desired sideband frequency is now being passed by bandpass filter optical cavity 33.

It is also known that when a desired sideband frequency 41 is higher than reference frequency 11, reference gap 40 between mirror 19 and 34 must be decreased in size in order to count and thus find that higher frequency sideband, and it is known that when a desired sideband frequency 41 is lower than reference frequency 11, reference gap 40 between mirror 19 and 34 must be increased in size in order to count and thus find that lower frequency sideband.

In embodiments of the invention, but without limitation thereto, an optical parametric amplifier utilized was a MgO:LiNbO$_3$ crystal heated to about 108-degrees centigrade, to provide phase matching at 1064 nanometers when pumped by a CW 532 nanometer pumping beam.

The invention has been described in detail while making reference to various embodiments thereof. Since it is known that others skilled in the art will readily visualize yet other embodiments that are within the spirit and scope of this invention, the above detailed description is not to be taken as a limitation on the spirit and scope of this invention.

What is claimed is:

1. Comb generating apparatus comprising:
   an input mirror and an output mirror physically spaced from each other to define a comb-generating optical cavity having a propagation axis;
   each of said input and output mirrors having a beam entry surface and a beam exit surface, said beam exit surface of said input mirror facing said beam entry surface of said output mirror;

a frequency source associated with said beam entry surface of said input mirror for providing a reference frequency beam to said comb-generating optical cavity, said reference frequency beam propagating along said propagation axis;

an optical amplifier/optical modulator assembly located within said comb-generating optical cavity, said optical amplifier/optical modulator assembly being physically located along said propagation axis; and control means associated with said optical modulator for controlling the transmission length or efficiency of said optical modulator;

operation of said comb-generating optical cavity providing a multi-frequency comb that exits said comb-generating cavity by way of said beam exit surface of said output mirror; and said multi-frequency comb comprising a plurality of comb frequencies that are centered on a frequency of said reference beam.

2. The apparatus of claim 1 including:
a tunable bandpass filter optical cavity located to intercept said multi-frequency comb, said bandpass filter being optically tunable to pass at least one comb frequency that is within said multi-frequency comb.

3. The apparatus of claim 1 wherein said optical amplifier is an optical parametric amplifier.

4. The apparatus of claim 1 wherein said optical modulator is an electro-optic modulator.

5. The apparatus of claim 4 wherein said control means comprises microwave control means.

6. The apparatus of claim 1 wherein said optical amplifier is an optical parametric amplifier, wherein said optical modulator is an electro-optic modulator, and wherein said control means comprises microwave control means.

7. The apparatus of claim 6 including:
a tunable bandpass filter optical cavity located to intercept said multi-frequency comb, said bandpass filter being tunable to pass at least one frequency that is within said multi-frequency comb.

8. The apparatus of claim 1 wherein said frequency source is a laser and including:
a first tunable bandpass filter optical cavity located intermediate said laser and said beam entry surface of said input mirror, said second tunable bandpass filter being tuned to pass a maximum intensity of said reference beam.

9. The apparatus of claim 8 including:
a second tunable bandpass filter optical cavity located to intercept said multi-frequency comb, said second bandpass filter optical cavity being tuned to pass at least one frequency that is within said multi-frequency comb.

10. The apparatus of claim 9 wherein said optical amplifier is an optical parametric amplifier, wherein said optical modulator is an electro-optic modulator, and wherein said control means comprises microwave control means.

11. A method of generating a multi-frequency comb comprising the steps of:
providing an input mirror and an output mirror that are physically spaced from each other to define a comb-generating optical cavity having a propagation axis;

each of said input and output mirrors having a beam entry surface and a beam exit surface, said beam exit surface of said input mirror facing said beam entry surface of said output mirror;

providing a frequency source that is associated with said beam entry surface of said input mirror, and that provides a reference frequency beam to said comb-generating optical cavity, said reference frequency beam propagating along said propagation axis;

providing an optical amplifier/optical modulator assembly that is located within said comb-generating optical cavity on said propagation axis; and providing control means associated with said optical modulator for controlling the optical path length of said optical modulator;

operation of said comb-generating optical cavity providing a multi-frequency comb that exits said comb-generating cavity by way of said beam exit surface of said output mirror;

said multi-frequency comb comprising a plurality of comb frequencies that surround said reference frequency beam.

12. The method of claim 11 including the steps of:
providing a tunable bandpass filter optical cavity that is located to intercept said multi-frequency comb; and tuning said bandpass filter being optically tunable to pass at least one frequency that is within said multi-frequency comb.

13. The method of claim 11 wherein said optical amplifier is an optical parametric amplifier.

14. The method of claim 11 wherein said optical modulator is an electro-optic modulator.

15. The method of claim 14 wherein said control means comprises microwave control means.

16. The method of claim 11 wherein said optical amplifier is an optical parametric amplifier, wherein said optical modulator is an electro-optic modulator, and wherein said control means comprises microwave control means.

17. The method of claim 16 including the steps of:
providing a tunable bandpass filter optical cavity located to intercept said multi-frequency comb; and tuning said bandpass filter being to pass at least one frequency that is within said multi-frequency comb.

18. The method of claim 11 including the steps of:
providing a first tunable bandpass filter optical cavity located intermediate said laser and said beam entry surface of said input mirror; and tuning said second tunable bandpass filter to pass a maximum intensity of said reference frequency beam.

19. The method of claim 18 including the steps of:
providing a second tunable bandpass filter optical cavity located to intercept said multi-frequency comb; and tuning said second bandpass filter optical cavity to pass at least one frequency that is within said multi-frequency comb.

20. The method of claim 19 wherein said optical amplifier is an optical parametric amplifier, wherein said optical modulator is an electro-optic modulator, and wherein said control means comprises microwave control means.

21. A optical comb-generating apparatus, comprising:
a first movable mirror and a second fixed position mirror spaced from each other to define an optical comb-generating cavity having a propagation axis;

each of said first and second mirrors having a beam entry surface and a beam exit surface, said beam exit surface of said first mirror facing said beam entry surface of said second mirror;

an optical frequency source associated with said beam entry surface of said first mirror for providing a reference frequency beam to said optical comb-generating cavity, said reference frequency beam propagating along said propagation axis;

an optical amplifier and an optical modulator located within said optical comb-generating cavity, said optical amplifier and optical modulator being spaced along said propagation axis;

first control means associated with said optical modulator for controlling an optical path length of said optical modulator;

second control means associated with said first mirror for moving said first mirror to maintain said spacing between said first and second mirrors at a given relationship to a wavelength of said reference frequency beam;

operation of said optical comb-generating cavity providing an optical frequency comb that exits said optical comb-generating cavity by way of said beam exit surface of said second mirror;

said optical frequency comb comprising a plurality of sideband frequencies centered on said reference frequency beam;

a third movable mirror spaced from said second fixed position mirror, said third mirror having a beam entry surface and a beam exit surface, said beam exit surface of said second mirror facing said beam entry surface of said third mirror;

said second and third mirrors forming a first tunable bandpass filter optical cavity; and third control means associated with said third mirror for moving said third mirror to maintain said spacing between said second and third mirrors at a relationship to pass at least one sideband frequency within said optical frequency comb.

22. The apparatus of claim 21 wherein said optical amplifier is an optical parametric amplifier.

23. The apparatus of claim 21 wherein said optical modulator is an electro-optic modulator.

24. The apparatus of claim 21 wherein said optical amplifier is an optical parametric amplifier and wherein said optical modulator is an electro optic modulator.

25. The apparatus of claim 21 including:

a fourth movable mirror spaced along said propagation axis from said first movable mirror, said fourth mirror having a beam entry surface and a beam exit surface, said beam exit surface of said fourth mirror facing said beam entry surface of said first mirror;

said fourth and first mirrors forming a second tunable bandpass filter optical cavity; and fourth control means associated with said fourth mirror for moving said fourth mirror to establish said spacing between said fourth and first mirrors relative to a wavelength of said reference frequency beam.

26. The apparatus of claim 25 wherein said optical amplifier is an optical parametric amplifier and wherein said optical modulator is an electro-optic modulator.

27. The apparatus of claim 26 wherein said optical parametric amplifier comprises a $MgO:LiNbO_3$ crystal, and wherein said electro-optic modulator comprises a $MgO:LiNbO_3$ crystal.

28. A method of generating an optical frequency comb comprising the steps of:

providing a first movable mirror and a second fixed position mirror that are spaced from each other to define an optical comb-generating cavity having a propagation axis;

each of said first and second mirrors having a beam entry surface and a beam exit surface, said beam exit surface of said first mirror facing said beam entry surface of said second mirror;

providing an optical frequency source that is associated with said beam entry surface of said first mirror for providing a reference frequency beam to said optical comb-generating cavity, said reference frequency beam propagating along said propagation axis;

providing an optical amplifier and an optical modulator located within said optical comb-generating cavity, said optical amplifier and optical modulator being physically spaced along said propagation axis;

providing first control means associated with said optical modulator for controlling a transmission path length of said optical modulator;

providing second control means associated with said first mirror for moving said first mirror to maintain said spacing between said first and second mirrors at a given relationship to a wavelength of said reference frequency beam;

operation of said optical comb-generating cavity providing an optical frequency comb that exits said optical comb-generating cavity by way of said beam exit surface of said second mirror;

said optical frequency comb comprising a plurality of sideband frequencies centered on said reference frequency beam;

providing a third movable mirror that is physically spaced from said second fixed position mirror, said third mirror having a beam entry surface and a beam exit surface, said beam exit surface of said second mirror facing said beam entry surface of said third mirror;

said second and third mirrors forming a first tunable bandpass filter optical cavity; and providing third control means that is associated with said third mirror for moving said third mirror to maintain said spacing between said second and third mirrors at a relationship to pass at least one sideband frequency within said optical frequency comb.

29. The method of claim 28 wherein said optical amplifier is an optical parametric amplifier.

30. The method of claim 28 wherein said optical modulator is an electro-optic modulator.

31. The method of claim 28 wherein said optical amplifier is an optical parametric amplifier and wherein said optical modulator is an electro-optic modulator.

32. The method of claim 28 including the steps of:

providing a fourth movable mirror spaced along said propagation axis from said first movable mirror, said fourth mirror having a beam entry surface and a beam exit surface, said beam exit surface of said fourth mirror facing said beam entry surface of said first mirror, said fourth and first mirrors forming a second tunable bandpass filter optical cavity; and providing fourth control means that is associated with said fourth mirror for moving said fourth mirror to establish said physical spacing between said fourth and first mirrors relative to a wavelength of said reference frequency beam.

33. The method of claim 32 wherein said optical amplifier is an optical parametric amplifier and wherein said optical modulator is an electro-optic modulator.

34. A combined optical comb generator and optical bandpass filter, comprising:

a first mirror;

a second mirror physically spaced from said first mirror along a beam propagation axis;

an optical modulator and an optical amplifier located on said beam propagation axis intermediate said first and second mirrors;

said first mirror, said second mirror, said optical modulator, and said optical amplifier comprising a comb-generating optical cavity;

a beam source for directing a single frequency beam through said first mirror and into said comb-generating optical cavity;

said comb-generating cavity operating on said single frequency beam and generating a multi-frequency comb that exits said comb-generating optical cavity by way of said second mirror;

a third mirror spaced from said second mirror along said beam propagation axis;

said second mirror and said third mirror comprising a bandpass filter optical cavity;

said bandpass filter optical cavity operating on said multi-frequency comb and generating an output beam that comprises having at least one frequency that is within said multi-frequency comb;

said output beam being a function of a bandpass characteristic of said bandpass filter optical cavity; and said output frequency beam exiting said bandpass filter optical cavity by way of said third mirror.

35. The combined optical comb generator and optical bandpass filter of claim 34 wherein said first mirror is a movable mirror, wherein said second mirror is a mirror that is fixed in position, and including:

first control means associated with said first mirror and operable to control a position of said first mirror along said propagation axis to provide a propagation length of said comb-generating optical cavity in accordance with said single frequency beam.

36. The combined optical comb generator and optical bandpass filter of claim 35 wherein said third mirror is a movable mirror, and including:

second control means associated with said third mirror and operable to control a position of said third mirror along said propagation axis to provide a propagation length of said bandpass filter optical cavity in accordance with a desired output beam.

37. The combined optical comb generator and optical bandpass filter of claim 36 wherein said beam source is a laser, wherein said optical modulator is an electro-optic modulator, and including:

a modulation signal source connected to said electro-optic modulator.

38. The combined optical comb generator and optical bandpass filter of claim 37 wherein said optical amplifier is an optical parametric amplifier.

39. The combined optical comb generator and optical bandpass filter of claim 36 including:

a fourth mirror that is movably positioned on said propagation axis intermediate said beam source and said first mirror; and third control means associated with said fourth mirror and operable to control a position of said fourth mirror along said propagation axis in accordance with said single frequency beam.

40. The combined optical comb generator and optical bandpass filter of claim 39 wherein said beam source is a laser, wherein said optical modulator is an electro-optic modulator, and including:

a modulation signal source connected to said electro-optic modulator.

41. The combined optical comb generator and optical bandpass filter of claim 40 wherein said optical amplifier is an optical parametric amplifier.

42. The combined optical comb generator and optical bandpass filter of claim 41 wherein said optical parametric amplifier comprises a $MgO:LiNbO_3$ crystal, and wherein said electro-optic modulator comprises a $MgO:LiNbO_3$ crystal.

43. The combined optical comb generator and optical bandpass filter of claim 42 wherein said optical parametric amplifier and said electro-optic modulator are provided as a unitary assembly.

44. A method of providing a three mirror, serially arranged, comb-generating optical cavity and bandpass filter optical cavity comprising the steps of:

locating a first movable mirror on a propagation axis;

locating a second fixed mirror on said propagation axis so as to be spaced from said first mirror;

locating an optical modulator and an optical amplifier on said propagation axis intermediate said first and second mirrors;

said first mirror, optical modulator, optical amplifier and second mirror forming a comb-generating optical cavity;

providing first control means associated with said first mirror operable to control said location of said first mirror on said propagation axis in accordance with a desired width of a comb to be generated by said comb-generating optical cavity;

locating a third movable mirror on said propagation axis so as to be spaced from said second mirror;

said second and third mirrors forming a bandpass filter optical cavity; and providing second control means associated with said third mirror operable to control said location of said third mirror on said propagation axis in accordance with a desired bandpass characteristic to be achieved by said bandpass filter optical cavity.

45. The method of claim 44 wherein said optical amplifier is an optical parametric amplifier.

46. The method of claim 44 including the steps of:

providing a beam source operable to send a single frequency beam through said first mirror and into said comb-generating optical cavity;

locating a fourth movable mirror on said propagation axis intermediate said beam source and said first mirror; and providing third control means associated with said fourth mirror operable to control said location of said fourth mirror on said propagation axis in accordance with said single frequency.

47. The method of claim 46 wherein said optical amplifier is an optical parametric amplifier.

48. Apparatus providing a unitary optical comb generator and optical bandpass filter, comprising:

a first mirror;

a second mirror physically spaced from said first mirror along a beam propagation axis;

an optical modulator/optical amplifier assembly located on said beam propagation axis intermediate said first and second mirrors;

said first mirror, second mirror and optical modulator/ optical amplifier assembly comprising a comb-generating cavity;

a beam source directing a single frequency beam through said first mirror and into said comb-generating cavity;

said comb-generating cavity operating on said single frequency beam and generating a multi-frequency comb that exits said comb-generating cavity by way of said second mirror;

a third mirror spaced from said second mirror along said beam propagation axis;

said second mirror and said third mirror comprising an output bandpass filter cavity;

said output bandpass filter cavity operating on said multi-frequency comb and generating an output beam that comprises having at least one frequency that is within said multi-frequency comb;

said output beam being a function of a bandpass characteristic of said bandpass filter cavity;

said output frequency beam exiting said bandpass filter cavity by way of said third mirror; and a fourth mirror physically positioned on said propagation axis intermediate said beam source and said first mirror;

said fourth mirror and said first mirror comprising an input bandpass filter cavity.

49. The apparatus claim 48 wherein said first mirror is a movable mirror, and including:

first control means associated with said first mirror and operable to control a position of said first mirror along said propagation axis to provide a propagation length of said comb-generating cavity in accordance with said single frequency beam.

50. The apparatus of claim 49 wherein said third mirror is a movable mirror, and including:

second control means associated with said third mirror and operable to control a position of said third mirror along said propagation axis to provide a propagation length of said output bandpass filter cavity in accordance with a desired output beam.

51. The apparatus of claim 50 wherein said fourth mirror is a movable mirror, and including:

third control means associated with said fourth mirror and operable to control a position of said fourth mirror along said propagation axis in accordance with said single frequency beam.

52. The apparatus of claim 51 wherein said beam source is a laser, wherein said optical modulator is an electro-optic modulator, and including:

a modulation signal source connected to said electro-optic modulator.

53. The apparatus of claim 52 wherein said optical amplifier is an optical parametric optical amplifier.

54. The apparatus of claim 53 wherein said electro-optic modulator comprises a $MgO:LiNbO_3$ crystal, and wherein said optical parametric amplifier comprises a $MgO:LiNbO_3$ crystal.

55. The apparatus of claim 54 wherein said electro-optic modulator and optical parametric amplifier comprise a unitary device.

* * * * *